(12) United States Patent
Klein

(10) Patent No.: US 8,726,926 B2
(45) Date of Patent: May 20, 2014

(54) UNIVERSAL WATER CONTROL TRIM

(75) Inventor: Jeremiah Klein, Manassas, VA (US)

(73) Assignee: Anna Gochenour, Haymarket, VA (US)

( * ) Notice: Subject to any disclaimer, the term of this patent is extended or adjusted under 35 U.S.C. 154(b) by 250 days.

(21) Appl. No.: 12/658,111

(22) Filed: Feb. 3, 2010

(65) Prior Publication Data

US 2011/0186142 A1    Aug. 4, 2011

(51) Int. Cl.
*F16K 31/60* (2006.01)

(52) U.S. Cl.
USPC ........... 137/315.15; 137/359; 4/695; 251/288

(58) Field of Classification Search
USPC ............. 137/359, 360, 315.15; 251/284, 285, 251/286, 288, 292, 293; 285/12, 46; 4/695; 52/302.3
See application file for complete search history.

(56) References Cited

U.S. PATENT DOCUMENTS

| | | | | |
|---|---|---|---|---|
| 2,202,147 A | * | 5/1940 | Gerriets | 52/99 |
| 3,397,863 A | * | 8/1968 | Bell | 251/285 |
| 4,813,455 A | * | 3/1989 | Iqbal | 137/625.17 |
| 4,842,009 A | * | 6/1989 | Reback | 137/315.15 |
| 5,025,826 A | * | 6/1991 | Schoepe et al. | 137/315.15 |
| 5,326,075 A | * | 7/1994 | Goff | 251/285 |
| 6,170,523 B1 | * | 1/2001 | Chang | 137/625.17 |
| 6,178,981 B1 | * | 1/2001 | Wales | 137/15.18 |
| 6,283,447 B1 | * | 9/2001 | Fleet | 251/288 |
| 6,409,148 B1 | * | 6/2002 | Dempsey et al. | 251/288 |
| 7,527,067 B2 | * | 5/2009 | Yang | 137/315.15 |
| 7,997,038 B2 | * | 8/2011 | Warnecke et al. | 52/302.3 |
| 2002/0125453 A1 | * | 9/2002 | Donath et al. | 251/288 |

* cited by examiner

*Primary Examiner* — John K Fristoe, Jr.
*Assistant Examiner* — Jessica Cahill
(74) *Attorney, Agent, or Firm* — Frank J. Kowalski

(57) ABSTRACT

A method and apparatus for installing water control is disclosed in which a universal template is provided to permit installation in all water providing arrangements with minimal configuration modifications. Replacement begins with a rough plate through which the water pipe extends. The rough plate is adjustable to accommodate a plurality of sizes of pipes. The rough plate is secured in its position with respect to the wall and water pipe extending through the wall. A cover plate fits onto the rough plate to provide a visually appealing presentation. A cover tube fits in the trim plate and surrounds a stem housing which attaches to the water pipe extending from the wall. The cover tube includes a stop position for the stem housing to prevent hot water from being delivered that exceeds a predetermined temperature. An external handle fits over the cover tube and attaches to the stem housing to control water flow from the shower head or bath faucet.

19 Claims, 4 Drawing Sheets

UNIVERSAL WATER CONTROL TRIM

BACKGROUND OF THE INVENTION

1. Field of the Invention

The present invention relates to shower head structures and more particularly to universal water control systems that may be used in conjunction with shower head structures and that may be universally applied.

2. Related Art

There are several methods and apparatus for replacing shower heads. In general, the base structure for water control handle for a shower head is simply a valve stem on the end of a valve that connects to hot and cold water pipes. The mix of both the hot and cold water determines the temperature of the water that comes out of the shower head or the bath faucet. The valve stem generally extends from the wall and may even include the pipe itself extending from the surface of a wall. The diameter of the pipe may vary along with the distance it extends from the wall. In addition, the size of the valve stem may not be uniform.

When replacing a shower assembly, including the shower head and the water control valve or handle, the old shower head is to be removed. All pipe threads, surfaces etc. must be cleaned and leveled. Replacement begins with a cover plate or trim plate through which the water pipe extends. A trim plate must be selected through which the valve stem of the water pipe fits. The trim plate is secured in its position with respect to the wall and the valve stem of the water pipe extending through the wall. This is commonly done by securing screws through the trim plate and screwing them into holes on the valve body. Generally a handle attaches to the valve stem either extending from the wall or located behind the wall. The handle includes a stop position for the stem housing to prevent scalding caused by excessively hot water being delivered. This stop prevents rotation of the valve stem so that the temperature of the mix coming out of the shower head will never be the temperature of that coming directly from the hot water heater.

In general, when a shower head or similar water control device is to be replaced, it usually must be replaced with one by the same manufacturer to avoid complications in the replacement. If a water control device manufactured by one other than the one that manufactured the one being replaced, the valve stem may extend too far from the wall to fit properly or the valve stem may not extend far enough to meet the handle. Also, the pipe from which the valve stem extends may be itself extending out of the wall. If any new water control device by a different manufacturer is to be used, additional work and modification of the system often results. This increases both the time involved in replacement and the overall cost of the project in materials and man hours.

Therefore, it is an object of the present invention to provide a system for replacement of water control devices that will simplify the installation of new controls without excessive materials and additional work.

It is a further object of the present invention to provide a universal water control replacement system that can be adapted to be used on any presently existing system.

It is an additional object of the present invention to reduce the amount of time required to replace water control systems.

SUMMARY OF THE INVENTION

The preferred embodiment of the present invention provides a water control apparatus for connecting to a water valve having a valve stem and includes a rough plate adapted to secure to the water valve, a cover plate attached to the rough plate, an cover tube configured to fit securely with the cover plate, a stem housing assembly within the cover tube adapted to connect to the valve stem and a control handle connected to the stem housing assembly to provide access to provide water control.

In this manner the present invention provides a universal water control system for providing and securing any replacement shower head or bath water control. A generally circular rough plate is secured in place by fastening it to the water valve. The rough plate has a center circular hole adapted to receive the smallest outlet pipe in normal usage. Removable concentric center pieces are provided to permit enlargement of the center circular hole for receiving larger outlet pipes while being capable of securing smaller pipes when in place. A cover plate having a center hole with a cut out notch is attached to the rough plate. A stem housing assembly is provided having a bifurcated base that secures to the valve stem. The stem housing assembly is contained within a cylindrical cover tube having an internal stop running lengthwise along its inner perimeter and a tab extending from its outer diameter at its base to fit into the notch in the cover plate. An extended portion of the stem housing assembly is adjustably configured to operate in conjunction with the internal stop of the cylindrical housing so that the maximum value of allowed water temperature may be controlled. The stem housing assembly is connected to an external handle to allow operation of the control system.

DESCRIPTION OF THE PREFERRED EMBODIMENT

The present invention provides a universal system for the replacement of existing, worn water control systems.

Figure 1:
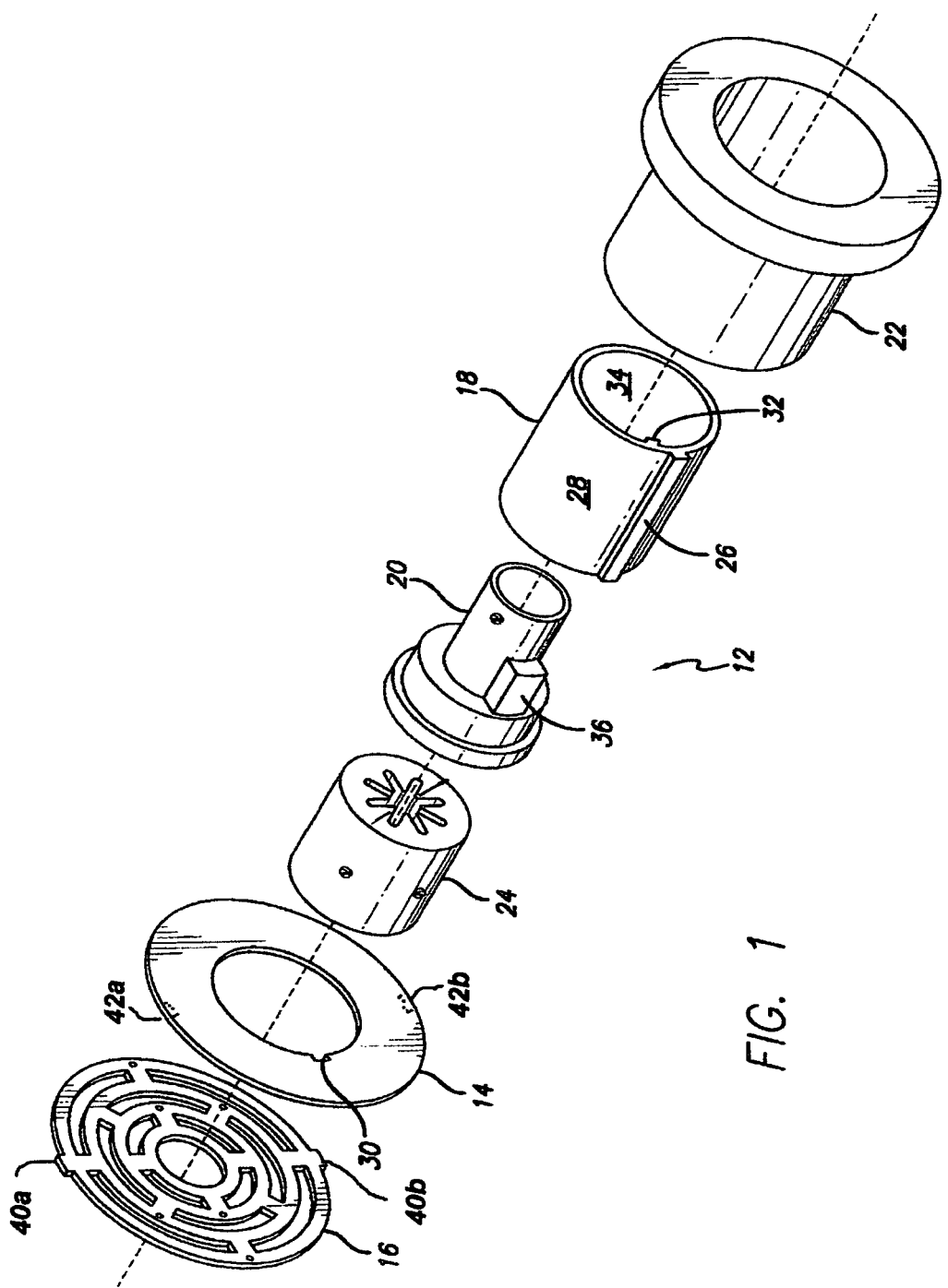
FIG. 1 is an exploded perspective view of a water control assembly of the present invention.

Referring to FIG. 1, an exploded perspective view of a water control assembly 12 is shown. Water control assembly 12, as described, is used in conjunction with a bathroom shower head, however, it may be used with a bath tub alone or a combination bath and shower or just a shower alone.

Water control assembly 12 is illustrated as having a generally circular cover plate 14 that fits over a rough plate 16 (see FIG. 2), a cover tube 18 enclosing a valve stem control 20 attached to a control handle 22 on one end and is secured to a bifurcated base 24 (see FIG. 4) at the other end. Cover tube 18 has a bar 26 extending out of cover tube outer wall 28. Bar 26 is configured to fit into notch 30 of cover plate 14 to prevent rotation of cover tube 18. Cover tube 18 also has an inner stop 32 extending the length of cover tube 18 on its inner wall 34. Inner stop 32 operates in conjunction with rotation control tab 36 on valve stem control 20.

Figure 2:
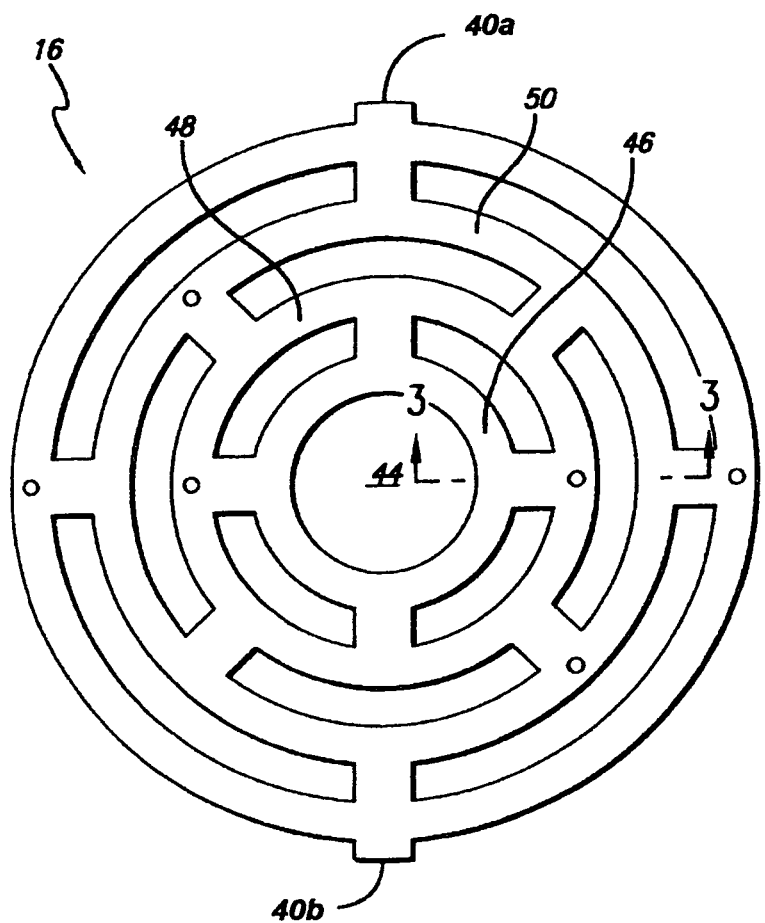
FIG. 2 is a top plan view of the rough plate of the present invention.

FIG. 2 is plan view of rough plate 16 of FIG. 1. Although rough plate 16 is illustrated as being generally circular in shape, it may be of any shape, oblong, square, rectangular, triangular, etc. as long as cover plate is a similar shape and the two fit together. Rough plate 16 is configured with extensions 40a and 40b to receive cover plate 14. Extensions 40a and 40b fit into slots 42a and 42b on cover plate 14. Cover plate 14 is then rotated to lock it in place with respect to rough plate 16. The locking configuration illustrated is for simplicity only. The interlocking fit of rough plate 16 and cover plate 14 may be of any type that provides a secure connection between the two plates. Rough plate 16 has a center circular hole 44 adapted to receive the smallest outlet pipe (not shown) that is currently in use in the industry.

Additional concentric holes may be formed by removal of sections 46, 48 and 50. These are provided to allow adaptations to various size outlet pipes that may be encountered in various installations. Concentric sections 46, 48 and 50 are provided to permit enlargement of center circular hole 44 for receiving larger outlet pipes while being capable of securing smaller pipes when in place. In addition, sections 46, 48 and 50 may be removed to allow valve stem control to extend within a wall if the outlet pipe does not extend from the wall. Sections 46, 48 and 50 may be removable through the use of reinforced knock out concentric sections held in place with perforated connections. In the preferred embodiment, concentric sections 46, 48 and 50 are held together with aligned overlapping tabs that are held together with set screws as illustrated in detail in FIG. 3.

Figure 3:
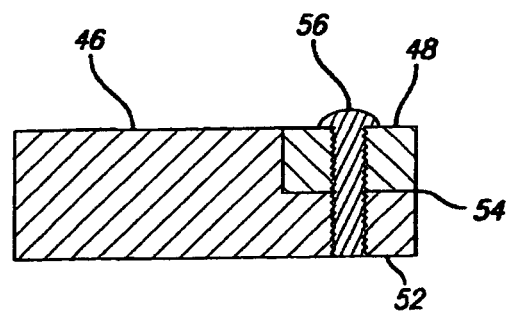
FIG. 3 is a cross sectional view of central section connections along lines A-A of FIG. 2.

FIG. 3 is a cross sectional view of the connections between concentric sections 46, 48 and 50 illustrating the preferred method of connection. Section 46 is illustrated as having extension 52 which fits into a slot 54 of section 48. Extension 52 and slot 54 are held together by a screw 56. The preferred embodiment utilizes concentric sections having tabs extending from the outer circumference of one section fitting into corresponding slots of the next section and attached to each other with screws. This provides a positive and secure but removable connection between concentric sections 46, 48, 50 and rough plate 16.

Figure 4:
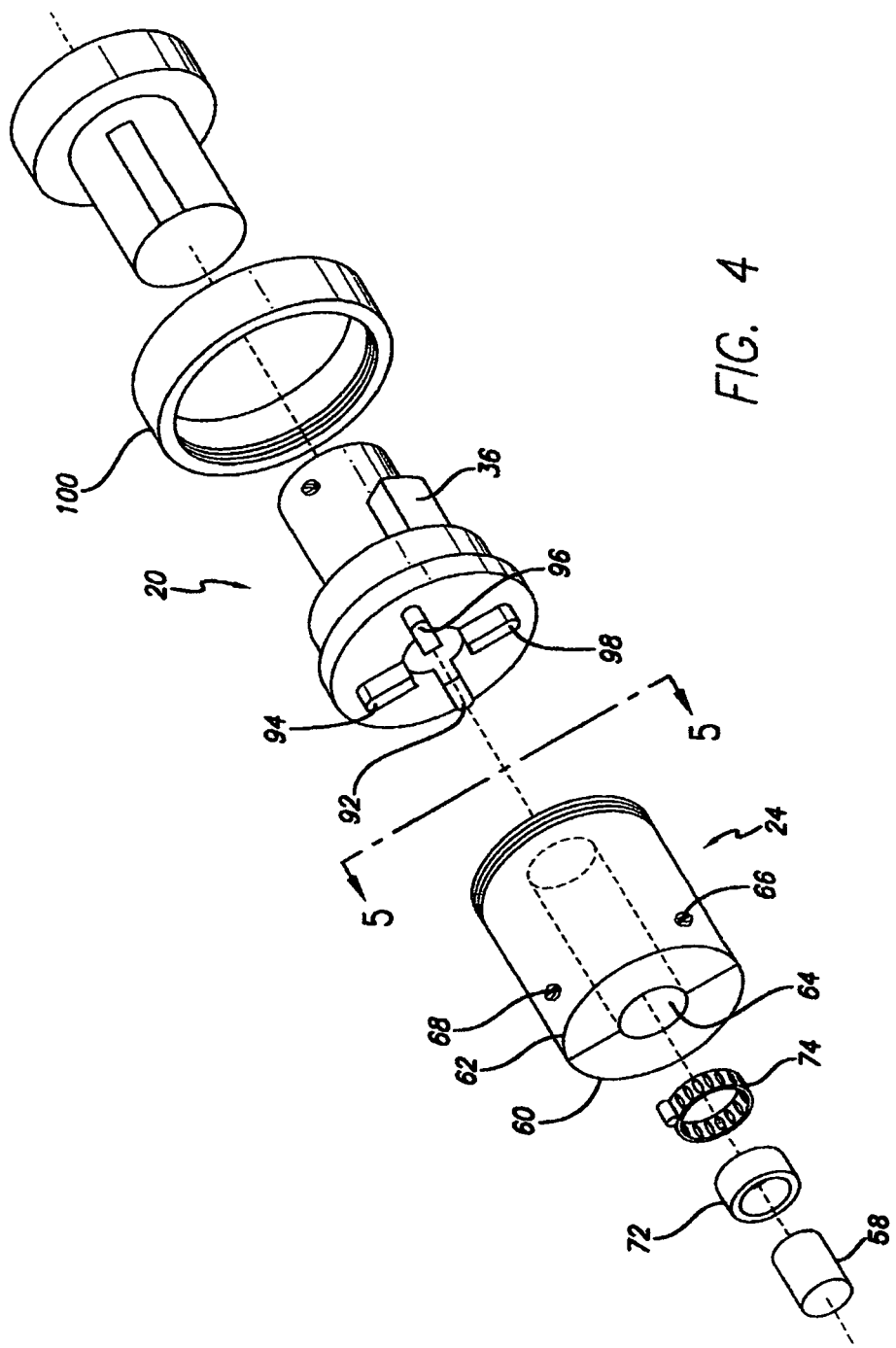
FIG. 4 is an isometric view of the stem housing assembly of FIG. 1.
Figure 5:
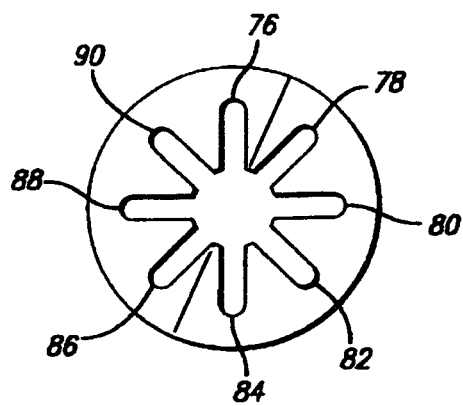
FIG. 5 is a plan view taken along lines B-B of FIG. 4.

Referring now to FIG. 4, an illustration of an exploded view of stem housing assembly 20 and bifurcated base 24 is shown. In operation, stem housing assembly 20 and bifurcated base 24 are contained within cover tube 18. A valve stem 58 extends out from a wall or may be contained behind the wall. Bifurcated base 24 has portions 60 and 62, each having a cut out portion forming center hole 64 that secures to valve stem 58 as it extends out from a wall. Bifurcated base 24 may also be inserted into the wall for valve stems that are accessible through a hole in the wall but does not extend out. If valve stem 58 does not extend out from a wall, rough plate 16 may be adjusted by removal of section 46 to allow stem housing assembly 20 to be placed into the wall to meet valve stem 58.

Portions 60 and 62 are held together by screws 66 and 68 which secure a rubber washer 72 located in center hole 64 to prevent leakage and provide a more secure grip on valve stem. Rubber washer 72 is secured in place around valve stem 58 by clamp 74. Both Rubber washer 72 and clamp 74 may be of any type currently in use in the art, however, a screw tightened clamp is used in the preferred embodiment for its simplicity.

Portions 60 and 62 have grooves 76, 78, 80, 82, 84, 86, 88 and 90 machined into their end which mates to stem housing assembly 20. Grooves 76, 78, 80, 82, 84, 86, 88 and 90 are arranged to receive matching projections 92, 94, 96 and 98 on stem housing assembly 20. Stem housing assembly 20 has a rotation control 36 to prevent rotation of valve stem control 20 past a predetermined point. Rotation control 36 acts in cooperation with inner stop 32 located on inner wall 34 of cover tube 28. By selecting which Grooves 76, 78, 80, 82, 84, 86, 88 and 90 matching projections 92, 94, 96 and 98 fit into, the predetermined point of rotation at which rotation control tab 36 meets with inner stop 32 can be selected. Grooves 76, 78, 80, 82, 84, 86, 88 and 90 are configured with projections 92, 94, 96 and 98 to provide eight different possible predetermined points at which rotation control tab 36 can be set. The predetermined point of rotation determines the maximum temperature value allowed for the water.

Valve stem control 20 is secured to bifurcated base 24 by a screw on ring 100 rotatably mounted on stem housing assembly 20. Ring 100 has threads which screw onto bifurcated base 24. By rotating ring 100 it is screwed onto bifurcated base 24. In performing this operation, valve stem control 20 is compressed against bifurcated base 24 and secured in place. When stem housing assembly 20 and bifurcated base 24 are attached, rotation of control handle 22 results in rotation of stem 58.

Figure 6:
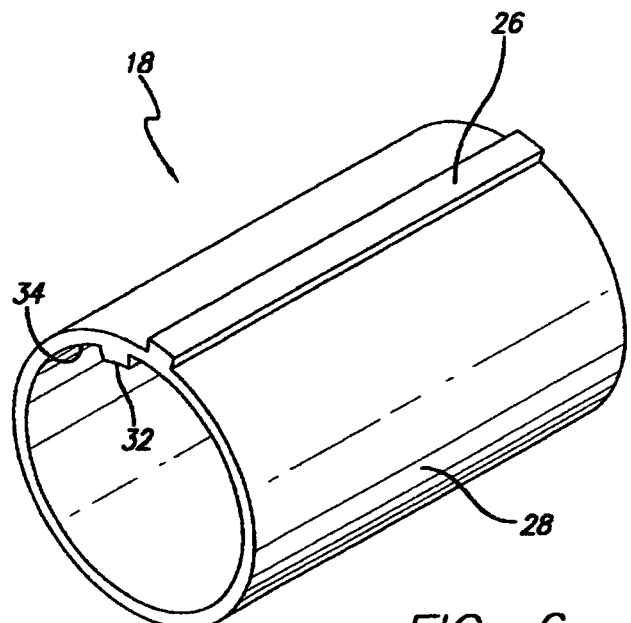
FIG. 6 is an isometric view of the cover tube of FIG. 1.

Referring now to FIG. 6, an isometric view of housing 28 is illustrated. Inner stop 32 and bar 26 are shown as extending the full length of cover tube 28. Although bar 26 is illustrated as extending the full length of cover tube 28, bar 26 only need be an appropriate length to securely fit in notch 30. In most situations bar 26 need only be of a length of one inch or less. The only requirement is that it fits securely into notch 30 and prevents rotation or movement of cover tube 28 with respect to cover plate 14. Inner stop 32 is provided to operate with rotation control tab 36 on stem housing assembly 20 to provide a rotation stop position for stem housing assembly 20 and thus for the valve stem of the water control valve. By selection of into which of groove 76, groove 78, groove 80, groove 82, groove 84, groove 86, groove 88 and groove 90 projection 92, projection 94, projection 96 and projection 98 are inserted, any one of a plurality of stop positions for stem housing assembly 20 and thus, for valve stem 58 may be selected.

While the present invention has been described by way of a preferred embodiment, it is to be understood that the present invention is not limited thereto but only by the scope of the following claims.

What is claimed is:

1. A water control apparatus for connecting to a water valve having a valve stem comprising:
   a rough plate adapted to secure to the water valve having extensions;
   a cover plate having recessed slots in which said extensions fit within and securely attach to said rough plate;
   a cover tube configured to fit securely with said cover plate;
   a stem housing assembly within said cover tube adapted to connect to the valve stem; and
   a control handle connected to said stem housing assembly to provide access to provide water control.

2. The water control apparatus according to claim 1 wherein said rough plate includes a cutout through which the valve stem may extend.

3. The water control apparatus according to claim 2 wherein said cutout includes removably attached concentric sections to permit enlargement of said cutout.

4. The water control apparatus according to claim 3 wherein said concentric sections are attached to one another through removable screws.

5. The water control apparatus according to claim 1 wherein:
   said stem housing assembly includes a rotation control tab; and
   said cover tube includes an inner stop to operate in cooperation with said rotation control tab to provide a maximum rotation point.

6. The water control apparatus according to claim 5 wherein said stem housing assembly includes:
   an adjustable bifurcated base arranged to provide one of a plurality of stop positions for said stem housing assembly.

7. The water control apparatus according to claim 6 wherein said rough plate includes a cutout through which the valve stem may extend.

8. The water control apparatus according to claim 7 wherein said cutout includes removably attached concentric sections to permit enlargement of said cutout.

9. The water control apparatus according to claim 8 wherein said concentric sections are attached to one another through removable screws.

10. A method for connecting to a water valve having a valve stem comprising:
    securing a rough plate having extensions to the water valve;
    attaching a cover plate with recessed slots in which said extensions fit within and securely attach to said rough plate;
    configuring a cover tube to fit securely with said cover plate;
    adapting a stem housing assembly within said cover tube to connect to the valve stem; and
    providing access to control water by connecting a control handle connected to said stem housing assembly.

11. The method for connecting to a water valve according to claim 10 wherein said step of securing a rough plate to the water valve includes:
    extending the valve stem through a center opening in said rough plate.

12. The method for connecting to a water valve according to claim 11 wherein said step of extending the valve stem includes:
    removing attached concentric sections to permit enlargement of said center opening.

13. The method for connecting to a water valve according to claim 12 wherein said removing step includes:
    removing screws to detach said concentric sections from one another.

14. The method for connecting to a water valve according to claim 10 wherein said step of providing access to control water includes:
    configuring said stem housing assembly and said cover tube to operate in cooperation to provide a maximum rotation point.

15. The method for connecting to a water valve according to claim 14 wherein said configuring step:
    adjusting said maximum rotation point to one of a plurality of stop positions for said stem housing assembly.

16. The method for connecting to a water valve according to claim 15 wherein said step of securing a rough plate to the water valve includes:
    extending the valve stem through a center opening in said rough plate.

17. The method for connecting to a water valve according to claim 16 wherein said step of extending the valve stem includes:
    removing attached concentric sections to permit enlargement of said center opening.

18. The method for connecting to a water valve according to claim 17 wherein said removing step includes:
    removing screws to detach said concentric sections from one another.

19. A water control apparatus for connecting to a water valve having a valve stem comprising:
    a rough plate having removably attached concentric sections attached to one another through removable screws to permit enlargement of a cutout adapted to secure to the water valve;
    a cover plate attached to said rough plate;
    a cover tube having an inner stop configured to fit securely with said cover plate;
    a stem housing assembly having a rotation control tab within said cover tube adapted to connect to the valve stem, said rotation control tab to operate in cooperation with said inner stop to provide a maximum rotation point, said stem housing assembly also having an adjustable bifurcated base arranged to provide one of a plurality of stop positions for said stem housing assembly; and
    a control handle connected to said stem housing assembly to provide access to provide water control.

* * * * *